US012152420B2

(12) United States Patent
Brown et al.

(10) Patent No.: US 12,152,420 B2
(45) Date of Patent: Nov. 26, 2024

(54) DEVICE FOR SECURING OPEN SLIDING WINDOWS AND DOORS

(71) Applicant: LaserSeed Inc., Calgary (CA)

(72) Inventors: Kenneth M. Brown, Calgary (CA); Randal G. Woo, Calgary (CA)

(73) Assignee: LaserSeed Inc., Calgary (CA)

(*) Notice: Subject to any disclaimer, the term of this patent is extended or adjusted under 35 U.S.C. 154(b) by 735 days.

(21) Appl. No.: 17/230,717

(22) Filed: Apr. 14, 2021

(65) Prior Publication Data

US 2021/0355724 A1 Nov. 18, 2021

(30) Foreign Application Priority Data

May 14, 2020 (CA) ...................................... 3080788

(51) Int. Cl.
*E05C 19/00* (2006.01)

(52) U.S. Cl.
CPC .................................. *E05C 19/003* (2013.01)

(58) Field of Classification Search
CPC ........................... E05C 19/003; E05B 65/0888
See application file for complete search history.

(56) References Cited

U.S. PATENT DOCUMENTS 5,131,186 A * 7/1992 Lamont ................. E05C 19/003 49/55
8,556,307 B1 * 10/2013 Schaffhausen ...... E05B 65/0888 292/DIG. 60
10,683,686 B2 6/2020 Brown et al.
11,473,340 B2 * 10/2022 Digmann ............ E05B 65/0888

OTHER PUBLICATIONS

Pupsik, "Dreambaby Sliding Door and Window Locks (2-pack)", downloaded from https://www.pupsikstudio.com/dreambaby-sliding-door-and-window-locks-2pk.html on Mar. 31, 2021.
Caridinal Gates, "Window Warden", downloaded from https://cardinalgates.com/shop/safety-products/window-safety-products/window-warden/ on Mar. 31, 2021.
Laserseed Inc., "Prowlock", first brochure made public available starting Nov. 13, 2018.
Laserseed Inc., "Prowlock", second brochure made public available starting Nov. 13, 2018.

* cited by examiner

*Primary Examiner* — Michael P Ferguson
*Assistant Examiner* — Thomas L Neubauer
(74) *Attorney, Agent, or Firm* — ATMAC Patent Services Ltd.; Andrew T. MacMillan

(57) ABSTRACT

A device for securing sliding windows and doors includes a telescoping bar and a plate. An end of the bar and the plate together form a connector pair that couples the bar end to the plate in one of a separable orientation and an inseparable orientation according to a relative angle between the bar end and the plate. The connector pair allows the bar to be separated from the plate in the separable orientation when the relative angle is a first angle, and the connector pair prevents the bar end being separated from the plate in the inseparable orientation when the relative angle is a second angle. A lock in the locked position physically prevents the relative angle between the bar end and the plate being changed from the second angle to the first angle. A T-bar or side-wing may prevent unlocking when the window or door is open.

18 Claims, 16 Drawing Sheets

DEVICE FOR SECURING OPEN SLIDING WINDOWS AND DOORS

CROSS-REFERENCE TO RELATED APPLICATIONS

This application claims the benefit of priority of Canadian Patent Application No. 3,080,788 filed May 14, 2020, which is incorporated herein by reference.

BACKGROUND OF THE INVENTION

(1) Field of the Invention

The invention generally pertains to security of sliding windows and doors. More specifically, the invention relates to a device for securing an open sliding window or door to prevent the window or door from opening more than a user-desired amount.

(2) Description of the Related Art

Placing security devices on or within a window, or within a window or door frame, to prevent unauthorized access from the exterior of a window to the interior of the window, is well known in the art. These devices include vertical and horizontal bars that are permanently installed and extend across the window, covering either the interior or exterior of a window to prevent passage through the window. These devices further include security systems built into the window sash to increase the aesthetics of the system while still offering the requisite protection from intruders.

While these existing devices provide the security needed to prevent unwanted entrances through a window, they have drawbacks. Initially, to install the devices that are permanently installed, one must screw the device into the window sash, the window frame or even the wall. This leaves holes behind if the owner ever wishes to remove the device. Additionally, these devices are not aesthetically appeasing nor are they portable. Further, other designs only allow the window to be closed while the device is in place, which is not desirable in climates where users would like fresh air to come through the window.

Home break-ins are known to increase significantly during seasons when windows are left open for ventilation. Also, sadly, accidents can occur when children lean against open windows and fall.

The increase in break-ins and child-falls illustrates the challenge of easily securing an open window for both events. There are ample window security bars commercialized, and some are 'break-away', but those bars are easily defeated and removed from the outside. There are also other portable window security solutions, but they also lack tamper-proofing. It is also worth noting that 'broom-stick' window blocks are easily defeated by a prowler on the outside if the window is left open for ventilation.

BRIEF SUMMARY OF THE INVENTION

An exemplary object of some embodiments of the invention is to provide a simple-to-install device for securing sliding windows and doors that provides security and yet is easily removed from the inside by an authorized user only.

An exemplary object of some embodiments of the invention is to provide a window security device that is portable, does not damage the window or its frame, the sash, or the surrounding wall, and that provides the desired protection while allowing the window to be at least partially opened.

According to an exemplary embodiment of the invention there is disclosed a device for securing sliding windows and doors. The device includes a telescoping bar having a first end and a second end with an adjustable length therebetween. The device further includes a first plate for coupling to the first end of the telescoping bar, and a lock coupled to one of the telescoping bar and the first plate and moveable between a locked position and an unlocked position. The first end of the telescoping bar and the first plate together form a first connector pair. The first connector pair couples the first end of the telescoping bar to the first plate in one of a separable orientation and an inseparable orientation according to a relative angle between the first end of the telescoping bar and the first plate. The first connector pair allows the first end of the telescoping bar to be separated from the first plate in the separable orientation when the relative angle is a first angle, and the first connector pair prevents the first end of the telescoping bar being separated from the first plate in the inseparable orientation when the relative angle is a second angle different than the first angle. The lock in the unlocked position does not interfere with rotation of the first end of telescoping bar relative to the first plate, the lock in the unlocked position thereby allowing the relative angle to be freely changed between the first angle and the second angle while the first end of the telescoping bar is coupled to the first plate by the first connector pair. The lock in the locked position physically prevents the relative angle between the first end of the telescoping bar and the first plate being changed from the second angle to the first angle, the lock in the locked position thereby preventing the first end of the telescoping bar being separated from the first plate while the first end of the telescoping bar is coupled to the first plate by the first connector pair.

According to an exemplary embodiment of the invention, tamper-proofing is achieved without tools required to drill holes in the window or frame by taking advantage of the open sliding window and sash for support. In an advantageous embodiments, the same design as utilized to secure windows in any orientation and size is also utilized to secure other sliding egress points of a building such as sliding glass and patio doors.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
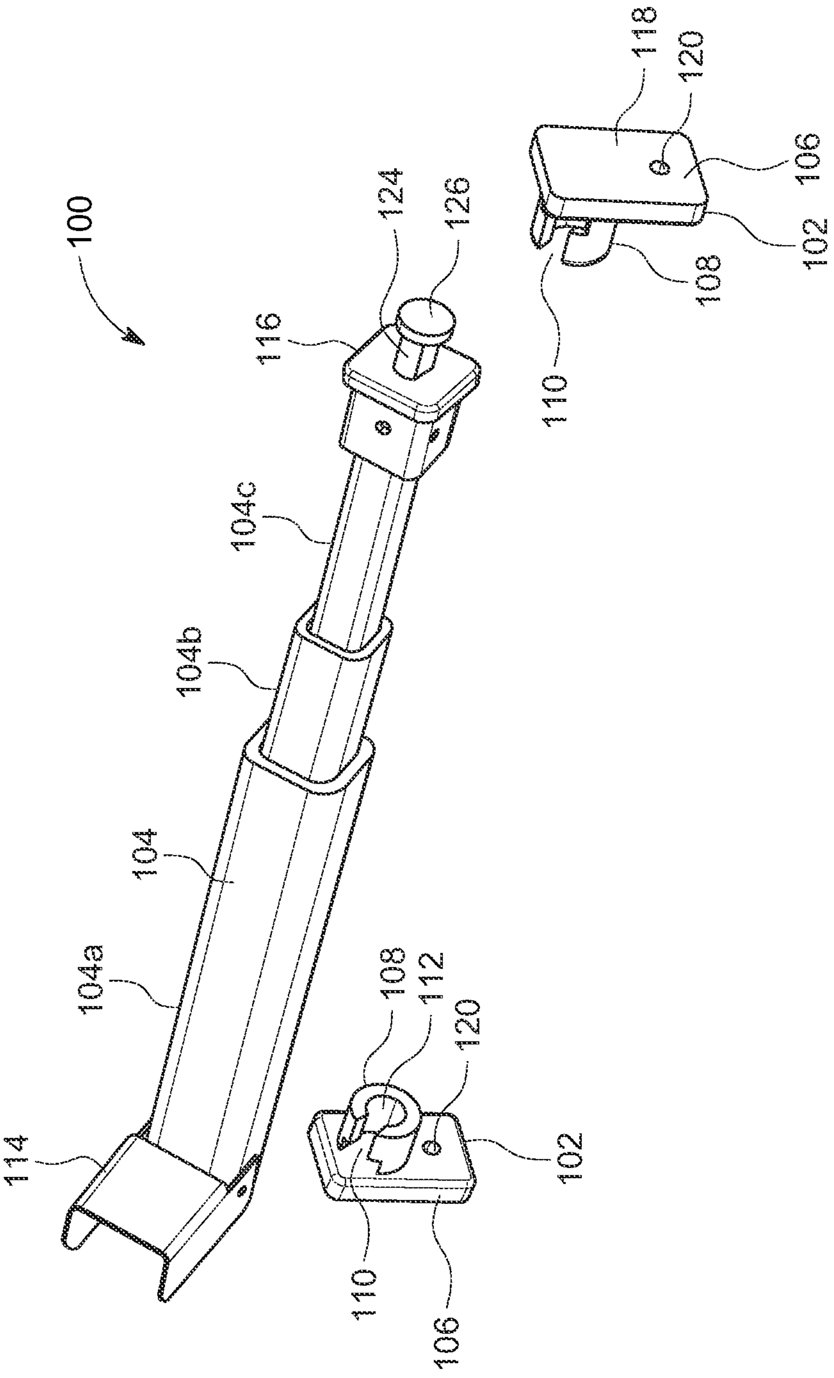
FIG. 1 shows a perspective exploded view of a device for securing sliding windows and doors according to an exemplary embodiment.

FIG. 1 shows a perspective exploded view of a device 100 for securing sliding windows and doors according to an exemplary embodiment. The device 100 includes first and second socket plates 102 and a telescoping bar 104. The first and second plates 102 in this embodiment are symmetrical to one another and each include a rectangular base 106 from which a connector socket 108 extends. The socket 108 includes a jaw opening 110 leading to an inner area 112 within the socket 108. The telescoping bar 104 includes a lock 114 and first and second end connectors 116. Together the end connector of the bar and the corresponding plate form a connector pair. The end connectors 116 are the same structure in this embodiment.

The back surface 118 of the plates 102 includes an adhesive layer such as double-sided sticky tape and/or glue in order to secure the plates 102 to window frames and/or sash members. Likewise, a screw hole 120 is provided for securing the plate 106 to the frame or sash if desired by a user for a more permanent placement.

The lock 114 is formed by a pivoting lever coupled at pivot points 122 (see FIG. 4), and the first and second end connectors 116 in this embodiment include a non-circular neck 124 that extends lengthwise off each end and a circular knob 126 on the end of the neck 124.

The telescoping bar 104 itself is formed in this embodiment by a plurality of bars including an outer bar **104*a*, a middle bar 104*b*, and an inner bar 104*c*. Each of the outer bar 104*a* and the middle bar 104*b* are tubular in this embodiment and the three bars 104*a,b,c* slidably fit one inside the other (inner 104*c* into middle 104*b*, and middle 104*b* into outer 104*a*) thereby forming the telescoping bar 104** that can have its length adjusted.

Figure 2:
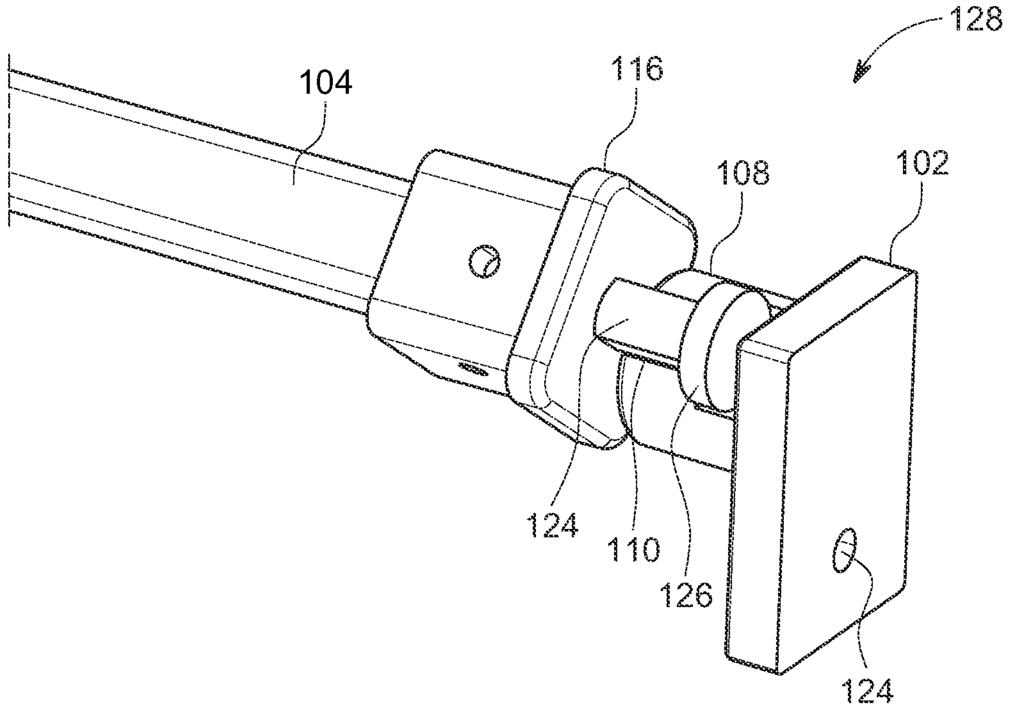
FIG. 2 shows a perspective view of the first end of the telescoping bar being inserted into the first socket plate to thereby form a first connector pair in a separable orientation according to an exemplary embodiment.

FIG. 2 shows a perspective view of the first end 116 of the telescoping bar 104 being inserted into the first socket plate 102 to thereby form a first connector pair 128 in a separable orientation according to an exemplary embodiment. As illustrated, the neck 124 of the first end 116 is a protrusion with a substantially of rectangular shape (with rounded corners) that fits into the jaw opening 110 on the first plate 102. As shown, the jaw opening 110 has a width that matches the width dimension of the neck 124.

In this embodiment, the jaw further includes a larger width opening 130 (see FIG. 3) for accommodating entry of the knob 126 into an inner area 112 within the socket 108. As illustrated in FIG. 2, the dimensions of the neck 124 and knob 126 along with the positions of the narrower and wider jaw openings 110, 130 on the socket 108 are together configured and arranged such it is only possible to insert (and remove) the neck 124 through the jaw opening 110 when the neck 124 is orientated relative to the jaw opening 110 as illustrated in FIG. 2. This angle of rotation is referred to herein as the first angle and involves the height dimension of the neck 124 being rotated to approximately a forty-five degree angle with respect to the ground plane upon which the first plate 102 sits.

Figure 3:
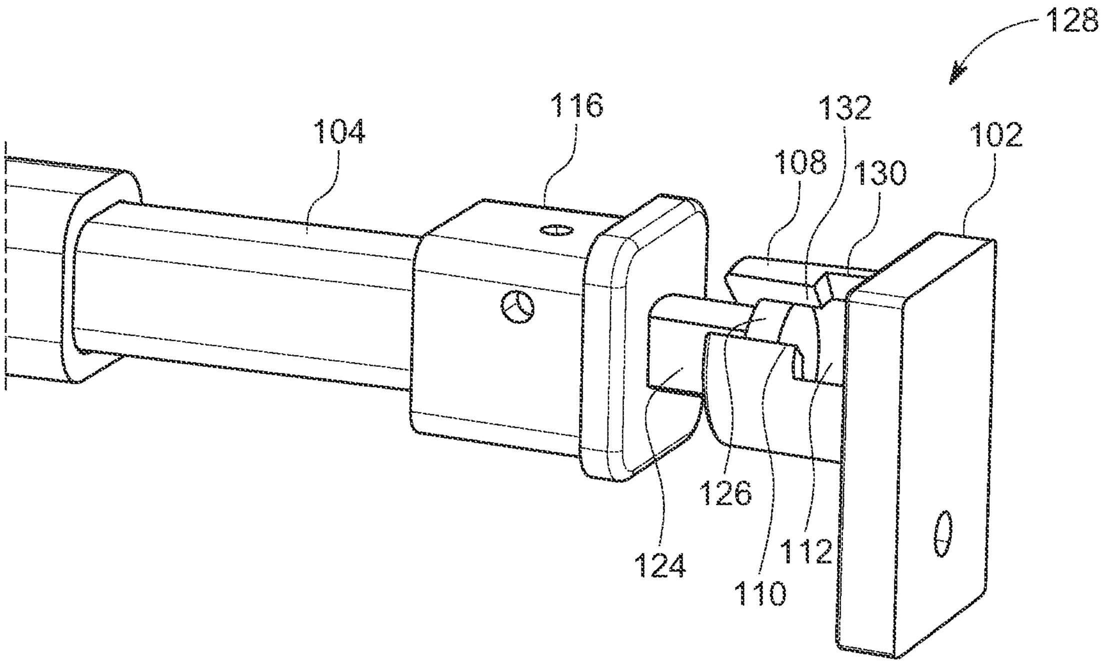
FIG. 3 illustrates a perspective view of the first end of the telescoping bar coupled to the first plate by the first connector pair in an inseparable orientation according to an exemplary embodiment.

FIG. 3 illustrates a perspective view of the first end 116 of the telescoping bar 104 coupled to the first plate 102 by the first connector pair 128 in an inseparable orientation according to an exemplary embodiment. As shown, once the neck 124 and knob 126 are passed via the respective narrower and wider openings of the jaw 110, 130, the neck 124 and knob 126 enter an inner area 112 within the socket 108. The inner area 112 is a circular space that matches a height dimension of the neck 124 such that the neck 124 can now be rotated from the first angle shown in FIG. 2 to a second angle shown in FIG. 3. As illustrated, the second angle corresponds to the height dimension of the neck 124 being substantially perpendicular to the plane on which the first plate 106 sits.

In this embodiment, the inner area 112 of the socket 108 further includes a recessed area 132 sized to fit the knob 126 on the end of the neck 124 such that the neck 124 can slide along the axis of the bar 104 toward the end of the socket 108 such that the knob 128 is now blocked from being laterally removed on all sides by the socket 108.

As illustrated in FIG. 3, in the inseparable orientation of the connector pair 128, it is impossible to separate the first end 116 of the telescoping bar 104 from the first plate 102 without first changing the relative rotational angle between the first end 116 and the first plate 102. In particular, the neck 124 simply cannot pass through the narrower jaw opening 110 without the neck 124 being rotated. In fact, removing the first end 116 of the telescoping bar 104 from the first plate 102 in this embodiment involves two distinct motions: a) moving the first end 116 of the bar 104 along the axis of the bar 104 toward the first plate 102 to thereby move the knob 128 to be adjacent the wider opening 130, and b) rotating the first end 116 of the telescoping bar 104 relative to the first plate 102 by about 45 degrees such that the width dimension of the neck 124 is aligned with the narrower opening 110 thereby allowing the neck 124 to pass through the narrower portion of the jaw opening 110. The connection pair 128 in this embodiment is referred to as child-resistant due to requiring two actions before separation can occur.

Figure 4:
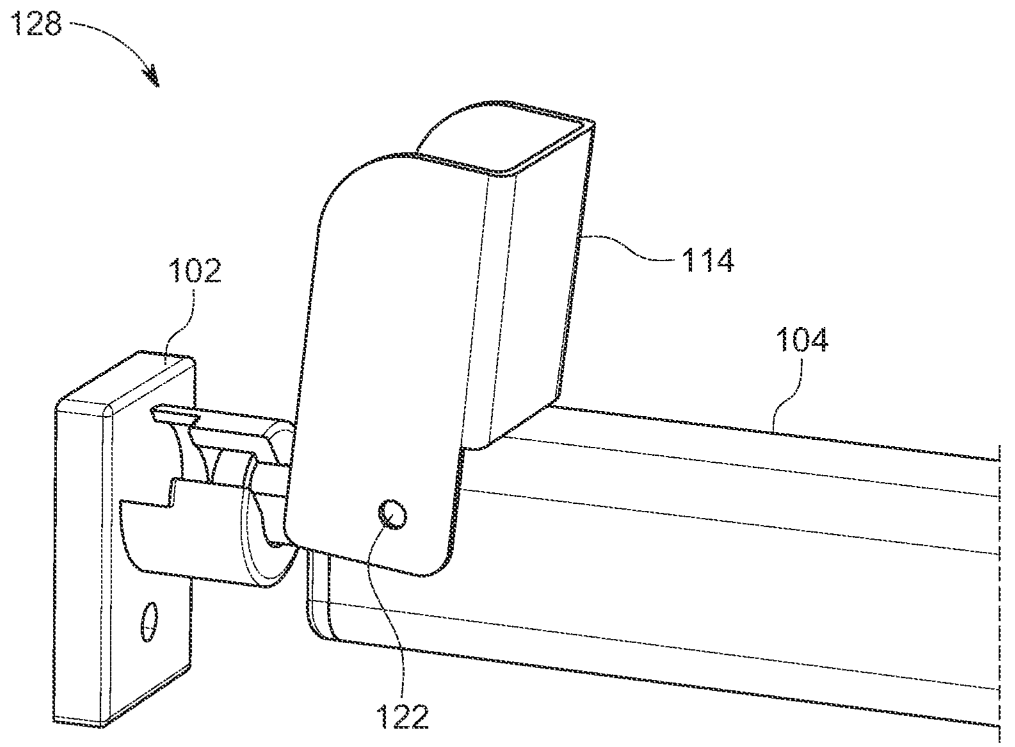
FIG. 4 illustrates a perspective view of the lock in the unlocked position according to an exemplary embodiment.

FIG. 4 illustrates a perspective view of the lock 114 in the unlocked position according to an exemplary embodiment. As illustrated, the lock 114 is formed by a U-shaped plate that is connected to the telescoping bar 104 via a pivot point 122. In this way, the U-shaped plate acts as a lever that can be pivoted upwards (shown in FIG. 4) and downwards (shown in FIG. 5). In the upwards position as shown in FIG. 4, the lever lock 114 does not abut against the second plate 102. In this way, the telescoping bar 104 can be freely rotated around its center lengthwise axis thereby changing the angle of the neck 124 relative to the second socket plate 116.

Figure 5:
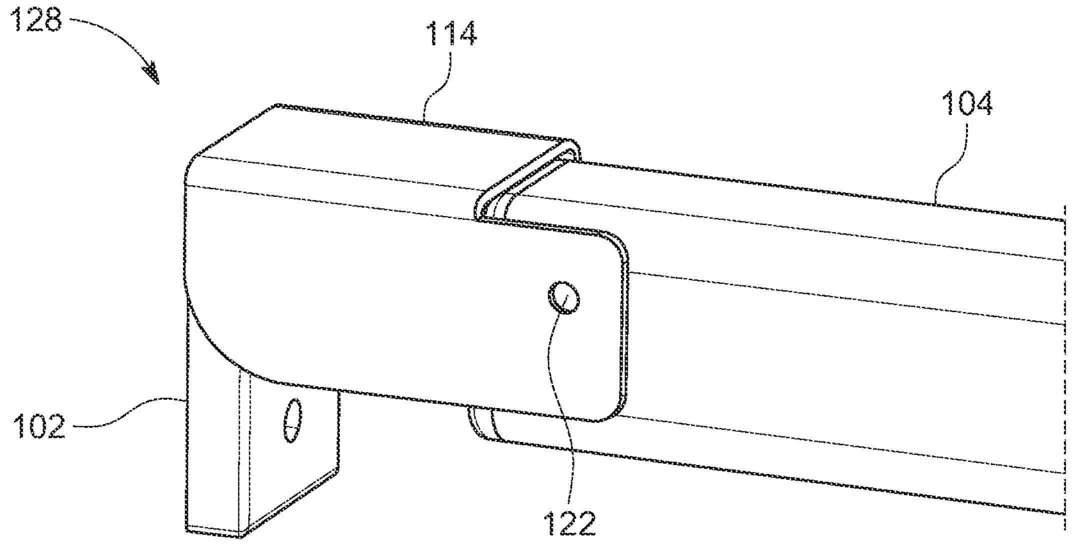
FIG. 5 illustrates a perspective view of the lock in the locked position according to an exemplary embodiment.

FIG. 5 illustrates a perspective view of the lock 114 in the locked position according to an exemplary embodiment. As shown, the lever lock 114 has now been pivoted downwards such that the U-shaped plate abuts and wraps around the top and right/left sides of the rectangular base 106 of the second plate 102. In this way, the lever lock 114 in the locked position as shown in FIG. 5 physically impedes any twisting motion of the telescoping bar 104 around its center lengthwise axis relative to the socket plate 102. The angle of the neck 124 relative to the second plate 102 is therefore fixed in the second angle. Said differently, the lock 114 in the locked position ensures that the connector pair 128 stays in the inseparable orientation.

Figure 6:
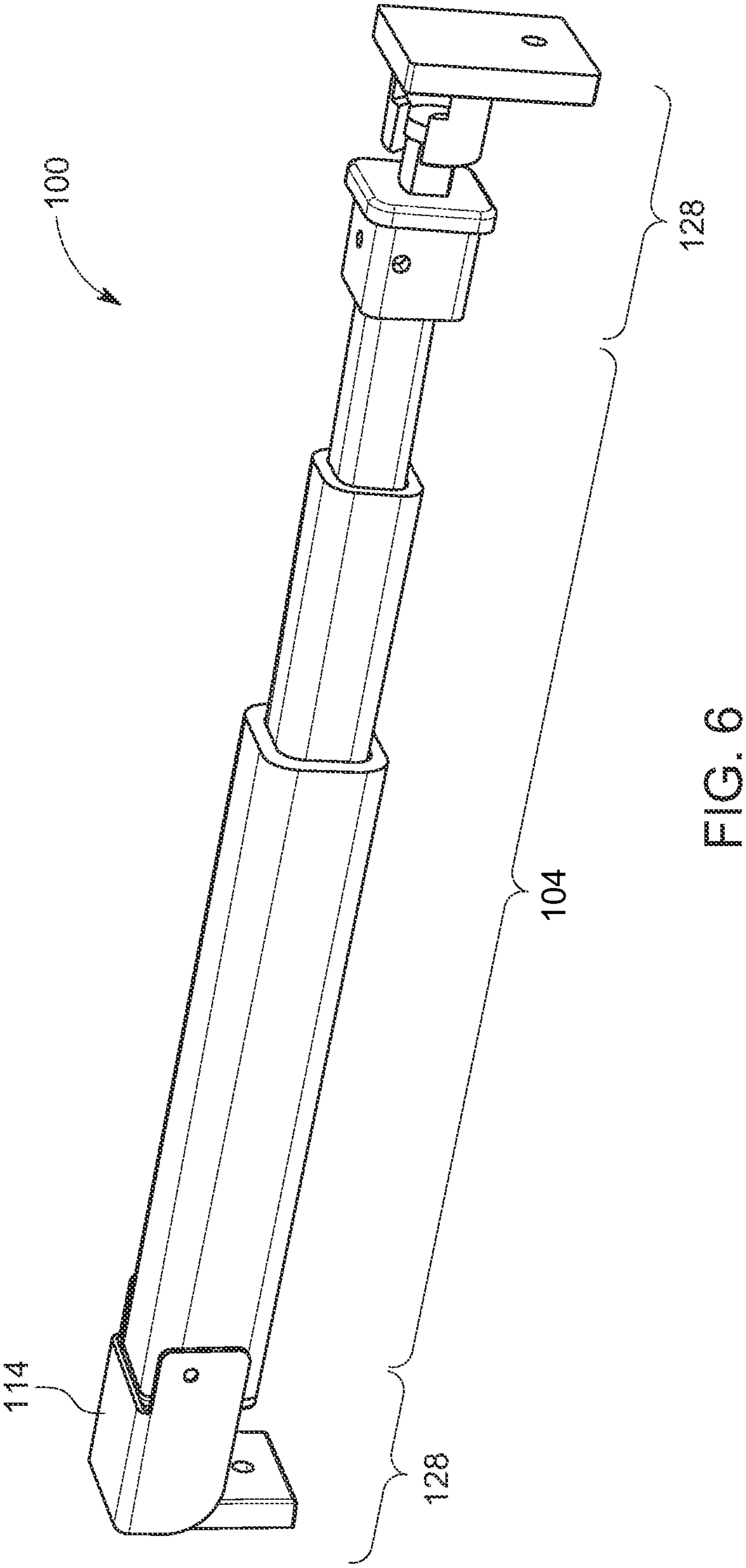
FIG. 6 illustrates the device of FIG. 1 with the connector pairs on each end locked in their inseparable orientations according to an exemplary embodiment.

FIG. 6 illustrates the device 100 of FIG. 1 with the connector pairs 128 on each end locked in their inseparable orientations according to an exemplary embodiment. The configuration of the device 100 as illustrated in FIG. 6 corresponds to how the device 100 would look when it is installed in a sliding window or door channel. However, one other setting that needs to be configured prior to usage in this embodiment is the length of the telescoping bar 104 itself.

Figure 7:
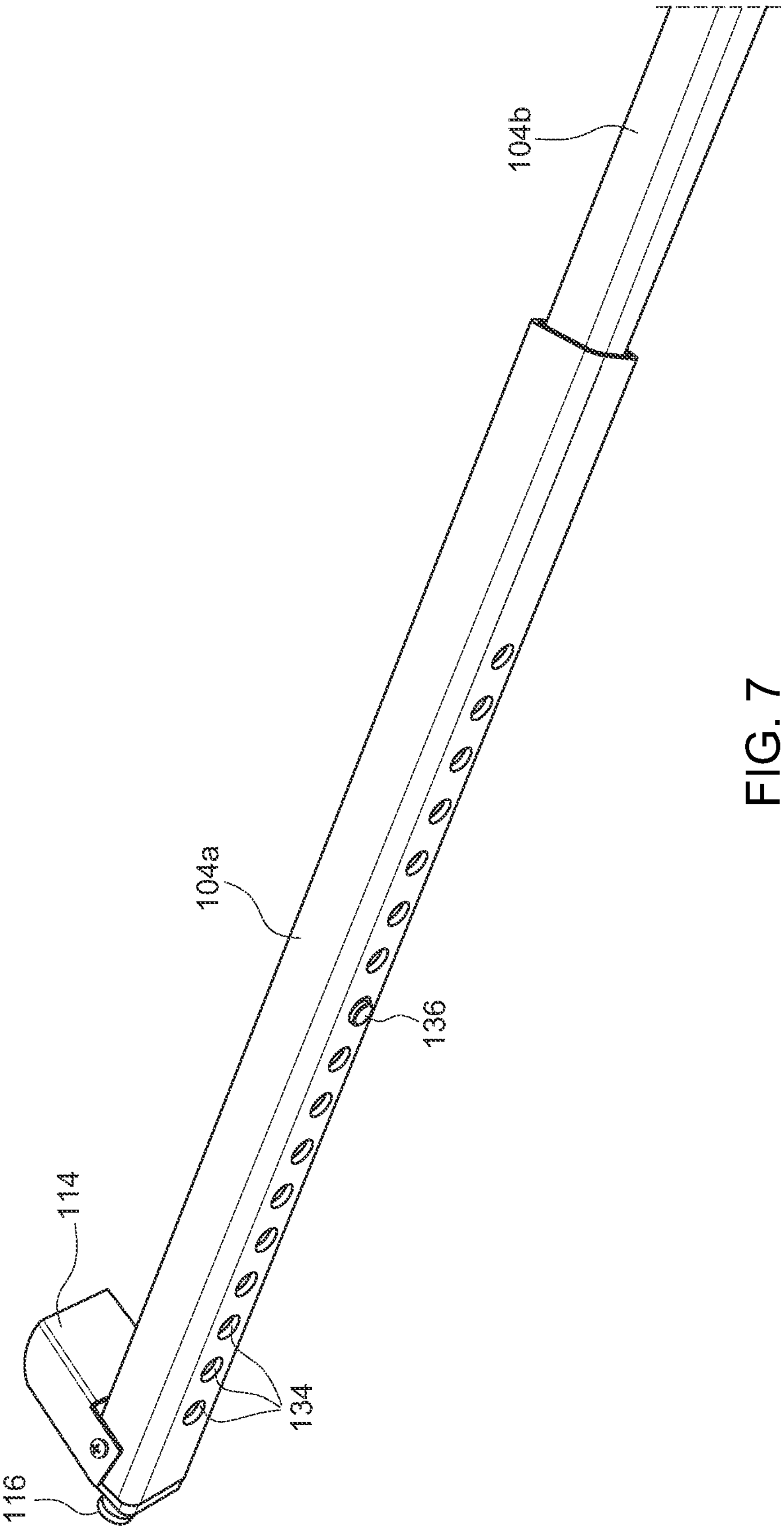
FIG. 7 illustrates a perspective view of the underside of the outer bar having a plurality of length-setting holes according to an exemplary embodiment.

FIG. 7 illustrates a perspective view of the underside of the outer bar **104*a* having a plurality of length-setting holes 134 according to an exemplary embodiment. As shown, the holes 134 are separated by uniform spacing such as half-an-inch and run lengthwise along the outer bar 104*a*. The middle bar 104*b* includes a spring-loaded tab protrusion 136 that fits into a desired length-setting hole 134. For setting the minimum length of the telescoping bar 104 as a whole, the user depresses the tab 136 and slides the middle bar 104*b* relative the outer bar 104*a* to the desired length. The tab 136 then protrudes through the length-setting hole 134 closest to that desired length and thereby prevents the outer and middle bars 104*a*,*b* from continuing to slide relative one another. The minimum length of the telescoping bar 104 is set by the hole 134 with which the tab 136 is held captive. In this embodiment, the inner bar 104*c* has no length-setting mechanism and therefore freely slides at all times within the middle bar 104*b***.

Figure 8:
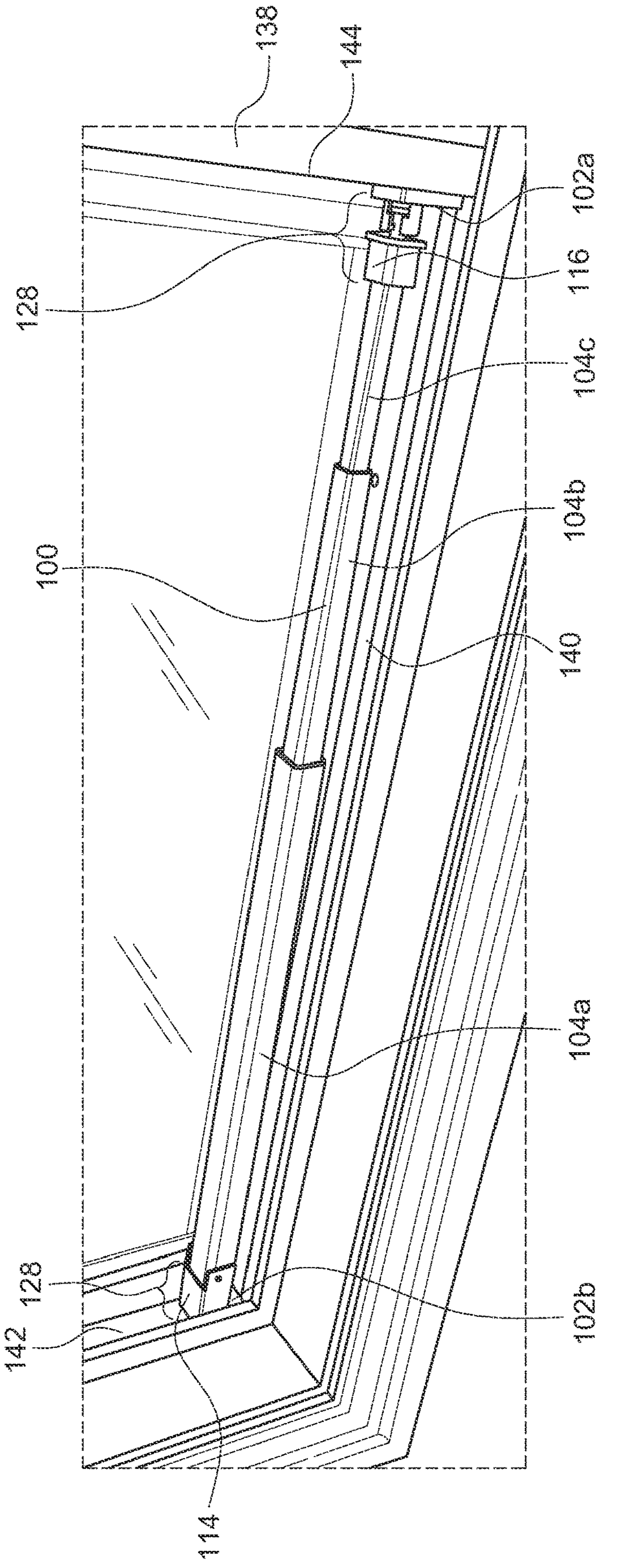
FIG. 8 illustrates the device of FIG. 1 securing a sliding window in the closed position according to an exemplary embodiment.

FIG. 8 illustrates the device 100 of FIG. 1 securing a sliding window 138 in the closed position according to an exemplary embodiment. As shown, the device 100 is installed in the sliding channel 140 and the first and second plates 102 are respectively secured against the non-moving window frame 142 and the movable window sash 144.

Figure 9:
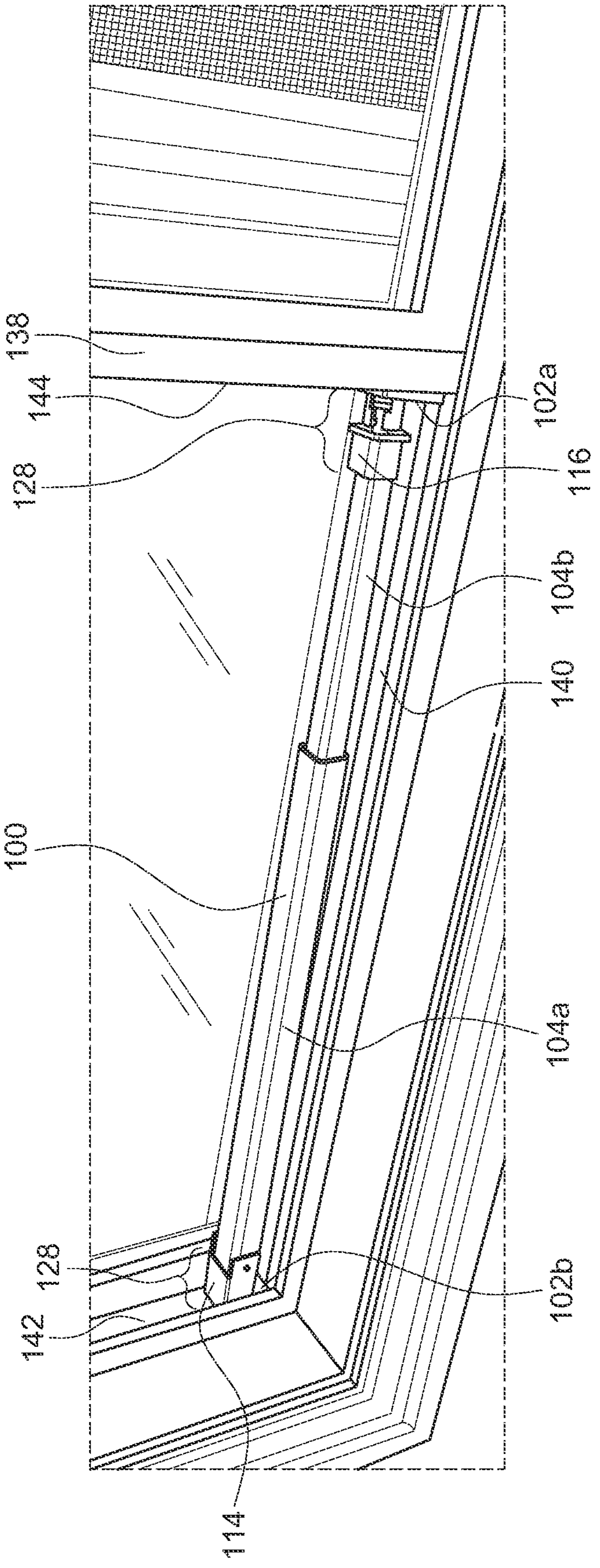
FIG. 9 illustrates the device securing the sliding window of FIG. 8 in an open position according to an exemplary embodiment.

FIG. 9 illustrates the device 100 securing the sliding window 138 of FIG. 8 in an open position according to an exemplary embodiment. As illustrated, the moveable window sash 144 in the open position pushes the inner bar **104*c* of the telescoping bar 104 fully into the middle bar 104*b* at which point the end of the middle bar 104*b* impacts the first connector end 102*a*. Since the middle bar 104*b* and the outer bar 104*a* are fixed at a particular length as a result of the length-setting holes 134/tab 136 described above in FIG. 7, the telescoping bar 104 will not compress any further than shown in FIG. 9 and the device 100 thereby blocks the window 138 from sliding open any further than as illustrated. The window 138 thereby provides some air circulation while still being prevented by the security device 100** from opening more than a small amount.

Beneficially, the device 100 makes it very difficult for a prowler or other unauthorized user on the outside of the window 138 to remove the device 100 from the window channel 138. For one, reaching through the opened window 138 with a stick, coat hanger, or other implement would not be sufficient to remove the telescoping bar 104. This is because the connector pairs 128 on each end are securely stuck to the window frames 142, 144 and are locked in the inseparable orientation so they will not allow the telescoping bar 104 to be removed without a twisting rotation being performed to change the relative angle of the bar ends 116 with the plates 102. However, the lever 114 being in the locked position blocks the telescoping bar 104 from being rotated. The lever 114 in this embodiment is positioned furthest from the open part of the window 138 and is therefore very difficult to reach from the outside of the house. The distance itself from the open part of the window 138 to the lock 114 acts a security measure.

Furthermore, as described above, the child-resistant nature of the connector pair 128 in this embodiment further requires two motions to separate the end 116 of the telescoping bar 104 from the plate 102, which helps prevent younger children within the house from removing the bar 104 in order to open the window 138 fully. Young children may lack the dexterity to perform both motions even if they do manage to get the lock 114 moved to the unlocked position. Thus in addition to preventing unauthorized users opening the window 138 from the outside, dangerous situations caused by children playing around open windows 138 can thereby be prevented in this embodiment.

Figure 11:
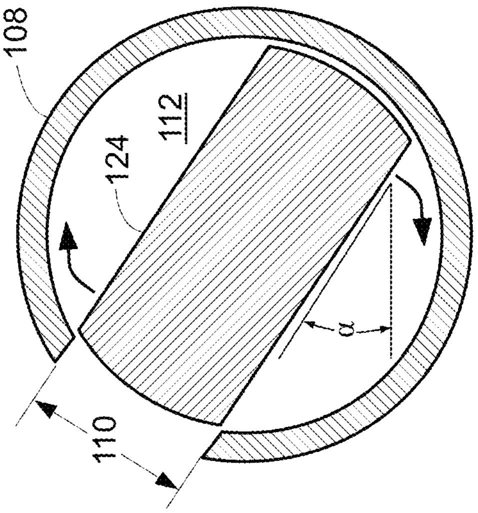
FIG. 11 illustrates how the neck can slide through the jaw opening into an inner area within the socket.
Figure 12:
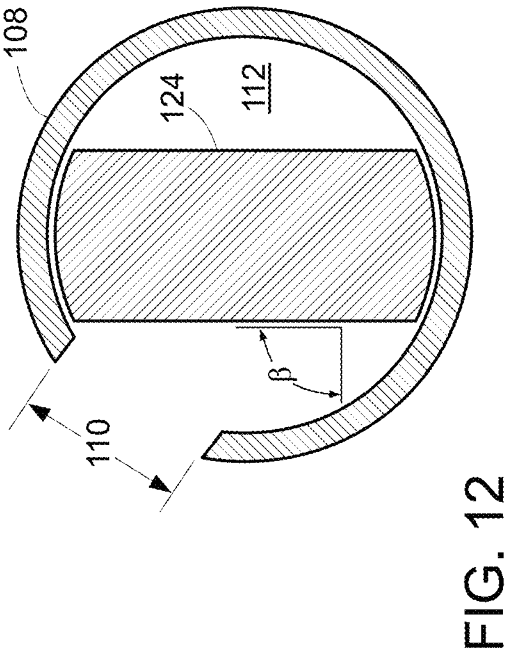
FIG. 12 shows the neck being rotated to be a second angle such that the connector pair is in the inseparable configuration.
Figure 10:
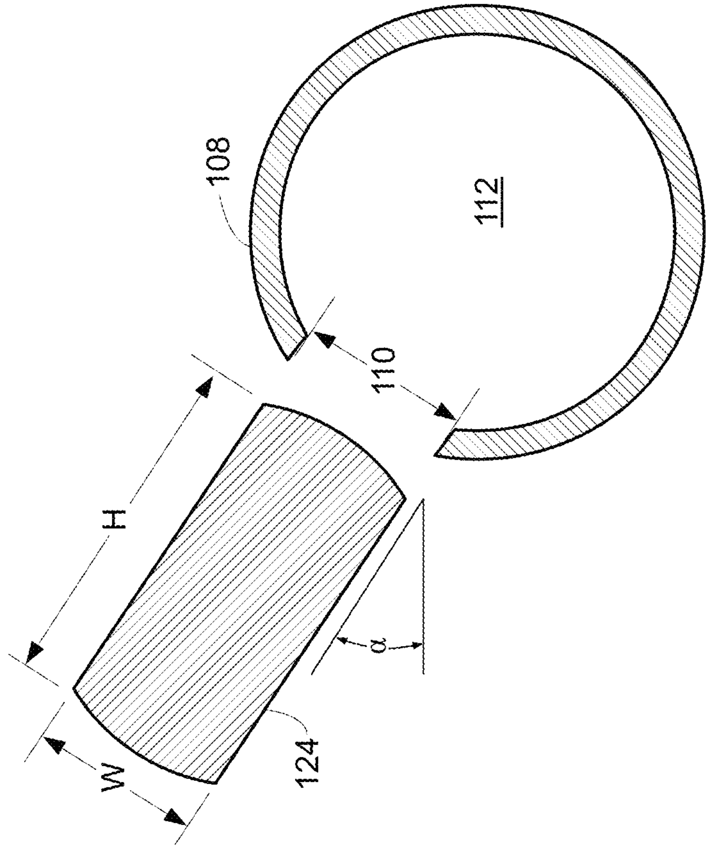
FIG. 10 illustrates how the width dimension of the neck corresponds to the size of the jaw opening.

FIGS. 10 to 12 illustrates various orientations of the neck 124 and jaw opening 110 of a connector pair 128 according to an exemplary embodiment.

FIG. 10 illustrates how the width dimension W of the neck 124 corresponds to the size of the jaw opening 110. In this way, the neck 124 needs to be rotated with a first angle $\alpha$ such that the width dimension of the neck 124 is aligned with the opening 110.

FIG. 11 illustrates how the neck 124 can slide through the jaw opening 110 into an inner area 112 within the socket 108. The first angle $\alpha$ of the neck 124 as illustrated in FIG. 11 corresponds to the connector pair 128 being in the separable configuration because the neck 124 can freely pass through the opening 110 without changing the angle of the neck 124. In some embodiments, the first angle $\alpha$ is substantially forty-five degrees.

FIG. 12 shows the neck 124 being rotated to be a second angle $\beta$ such that the connector pair 128 is in the inseparable configuration. In some embodiments, the second angle $\beta$ is substantially ninety degrees. Once the neck 124 passes by the narrower jaw opening 110, the angle of the neck 124 can be changed and the neck 124 can freely rotate around a circular path within the inner area 112. As clear from FIG. 12, in the inseparable configuration, the neck 124 cannot be removed from the inner space 112 without first rotating the neck 124 from the second angle (3 back the first angle $\alpha$. This is because the height dimension H of the neck 124 is much larger than the narrower jaw opening 110.

Figure 13:
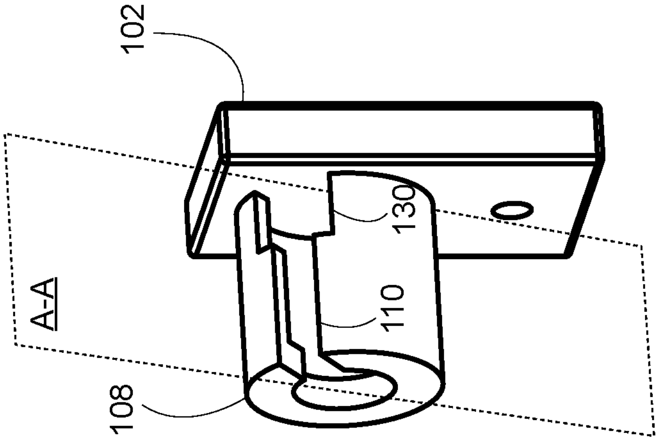
FIG. 13 illustrates a perspective view of a socket plate having a child-resistant configuration according to an exemplary embodiment.

FIG. 13 illustrates a perspective view of a socket plate 102 having a child-resistant configuration according to an exemplary embodiment. As shown, the first plate 102 has a recessed area 132 within the inner area 112 for allowing the circular knob 126 to move to help make the connector pair 128 child-resistant while in the inseparable orientation. The socket 108 of the first plate 102 includes a jaw opening that has two portions: a narrow opening 110 that only allows the width dimension of the neck 124 to pass, and a wider opening 130 that allows the circular knob 126 to pass. Once the neck 124 and knob 126 are both passed by their respective jaw openings 110, 130 and are present within the inner area 112 of the socket 108, the recessed area 112 allows the knob 126 to move laterally toward the front 146 of the socket 108. The neck 124 can shift forward via the front opening of the socket 108 and now it is not possible to remove the end of the telescoping bar 104 from the socket plate 102 without both moving the knob 126 back to be adjacent the wider jaw opening 130 and also rotating the neck 124 such that its width dimension aligns with the narrower jaw opening 110.

Figure 14:
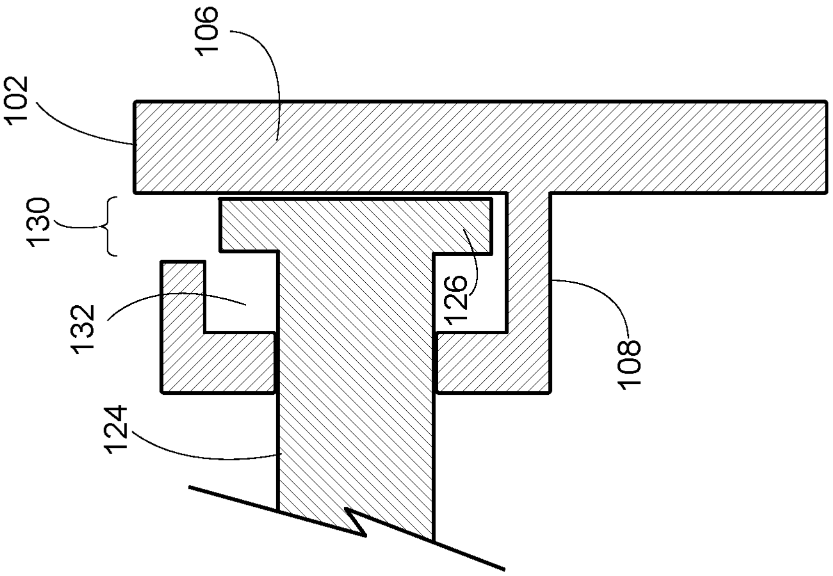
FIG. 14 illustrates a cross sectional view of a connector pair taken along the plane A-A illustrated in FIG. 13 while the knob has not yet entered the recessed area according to an exemplary embodiment.

FIG. 14 illustrates a cross sectional view of a connector pair 128 taken along the plane A-A illustrated in FIG. 13 while the knob 126 has not yet entered the recessed area 132 according to an exemplary embodiment. Immediately after the neck 124 is inserted into the jaw opening 110, the knob 126 will be located the wider jaw opening 130 (which can partially be seen in FIG. 14 given the angle of the plane A-A).

Figure 15:
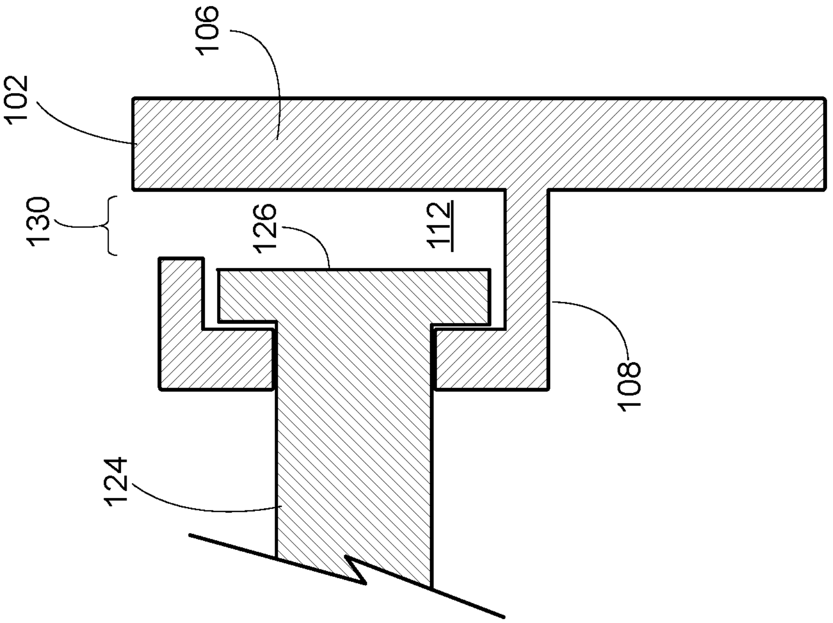
FIG. 15 illustrates a cross sectional view of the connector pair of FIG. 13 taken along the plane A-A after the knob has entered the recessed area according to an exemplary embodiment.

FIG. 15 illustrates a cross sectional view of the connector pair 128 of FIG. 13 taken along the plane A-A after the knob 126 has entered the recessed area 132 according to an exemplary embodiment. As shown, the knob 126 cannot be removed via the wider opening 130 without first being moved forward toward to the base 106 of the plate 102 such that it is adjacent the wider jaw opening 130. The child-resistant socket plate 102 of FIG. 13 is beneficial in some applications where there may be young children alone with the window 138 while the window is partially open.

Figure 16:
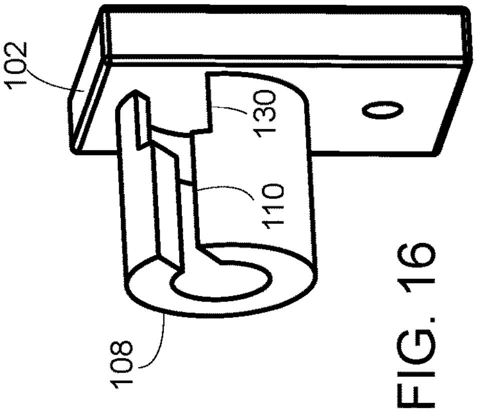
FIG. 16 illustrates a perspective view of a socket plate having an easy-remove configuration according to an exemplary embodiment.

FIG. 16 illustrates a perspective view of a socket plate 102 having an easy-remove configuration according to an exemplary embodiment. Unlike the child-resistant configuration of FIG. 13, there is no recessed area 132 within the inner area 112 of the socket 108 in the easy-remove embodiment of FIG. 16.

Figure 17:
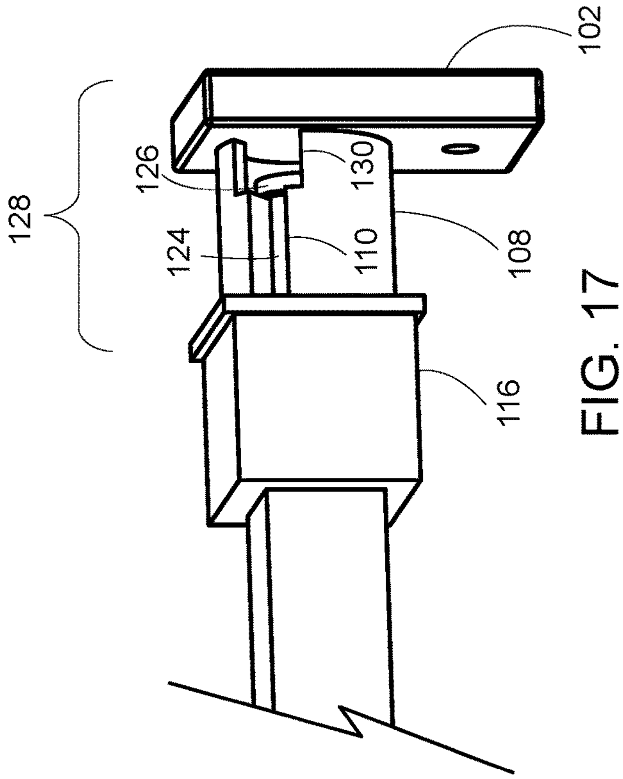
FIG. 17 illustrates a perspective view of a connector pair formed by the socket plate of FIG. 16 engaging the end of the telescoping bar according to an exemplary embodiment.

FIG. 17 illustrates a perspective view of a connector pair 128 formed by the socket plate 102 of FIG. 16 engaging the end 116 of the telescoping bar 104 according to an exemplary embodiment. As shown, the knob 126 is still adjacent the wider jaw opening 130, and therefore, assuming the neck 124 is rotated to the first angle $\alpha$ such that its width dimension is aligned with the narrower jaw opening 110 (i.e., the connector pair 128 is in the separable orientation), the end 116 of the telescoping bar 104 can be separated from the socket plate 102 with a lateral motion by the user to guide the neck 124 through the jaw opening 110.

Figure 18:
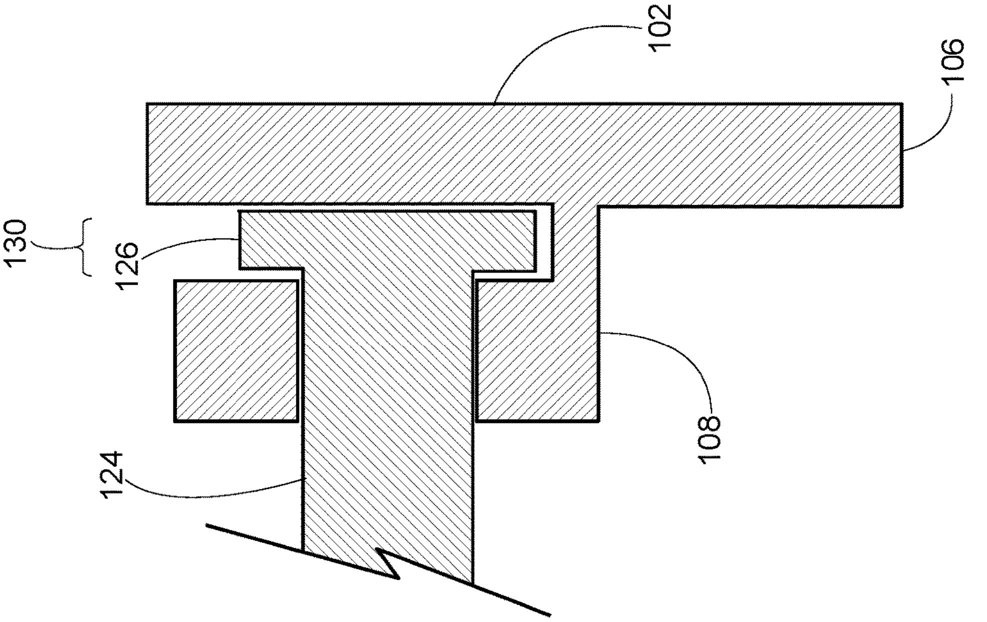
FIG. 18 illustrates a cross sectional view of the connector pair of FIG. 17 taken along a plane similar in angle to the plane A-A of FIG. 13.

FIG. 18 illustrates a cross sectional view of the connector pair 128 of FIG. 17 taken along a plane similar in angle to the plane A-A of FIG. 13. As illustrated in FIG. 18, there is no need to first pull the knob 126 forward toward the base 106 of the plate 102. Instead, the knob 126 is always directly adjacent the wider jaw opening 130 and the removal process is easier than that of FIG. 13. As long as the neck 124 is rotated relative to the socket plate 102 to the first angle $\alpha$, the neck 124 can be separated from the socket 108 in a simple lateral movement. The easy-remove socket plate 102 of FIG. 16 may be beneficial in some applications where simple removal is desired such as for quick removal of the security device 100 from the window 138 during a fire or other emergency situation where the window 138 needs to be opened fully.

Figure 19:
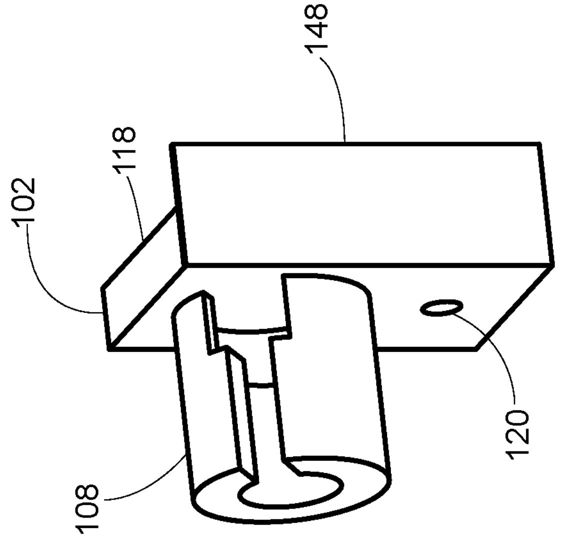
FIG. 19 illustrates a perspective view of a socket plate having a side-shield for protecting against chisel attacks by a prowler.

FIG. 19 illustrates a perspective view of a socket plate 102 having a side-shield 148 for protecting against chisel attacks by a prowler. The shield 148 is on the same side as the jaw opening 110 such that it wraps around a side of the movable sash frame 144 of the sliding window 138. The side-shield 148 blocks direct side access to the back surface 118 of the of the plate base 106. Without the side-shield 148, a prowler or other unauthorized individual on the outside of the window 138 could potentially reach through the open window 138 with a chisel or similar tool in order to wedge said tool directly parallel to the back surface 118 and pry the back surface 118 from the window sash frame 138. In installations where securing screws are not utilized (i.e., either the screw holes 120 or omitted or are not utilized), removal of the socket plate 102 from being secured against the moveable window sash 144 would allow the security device 100 to be removed from the window 138. To help prevent this, the side-shield 148 blocks direct side access to the back surface 118 by a chisel. This embodiment can make it much more difficult for the prowler to pry the plate 102 from the movable sash frame 142.

Figure 20:
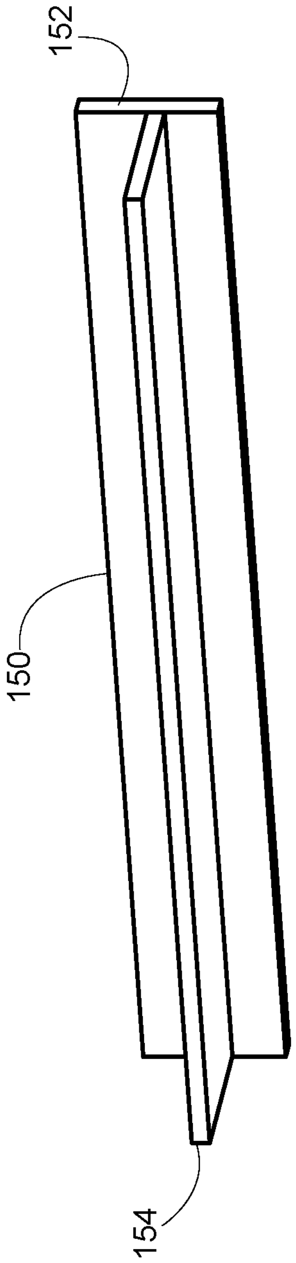
FIG. 20 illustrates a T-bar for preventing rotation of the telescoping bar and/or opening of the lock when the window or door being secured by the device is in an open position according to an exemplary embodiment.

FIG. 20 illustrates a T-bar 150 for preventing rotation of the telescoping bar 102 and/or opening of the lock 114 when the window 138 or door being secured by the device 100 is in an open position according to an exemplary embodiment. The T-bar 150 comprises a base 152 with a wing 154 extending therefrom substantially perpendicular to the base 152.

Figure 21:
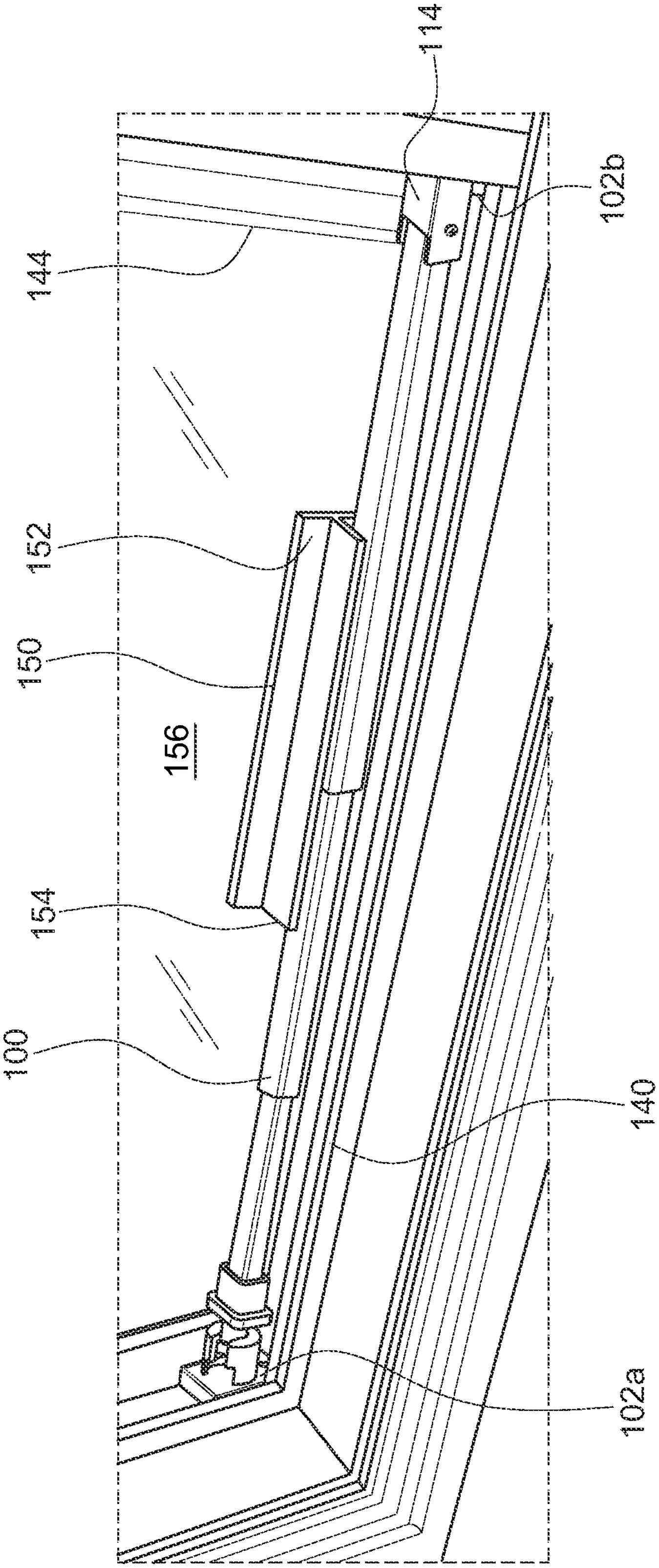
FIG. 21 illustrates the position of the lock where it is away from the T-bar and can therefore be unlocked when the window is closed.
Figure 22:
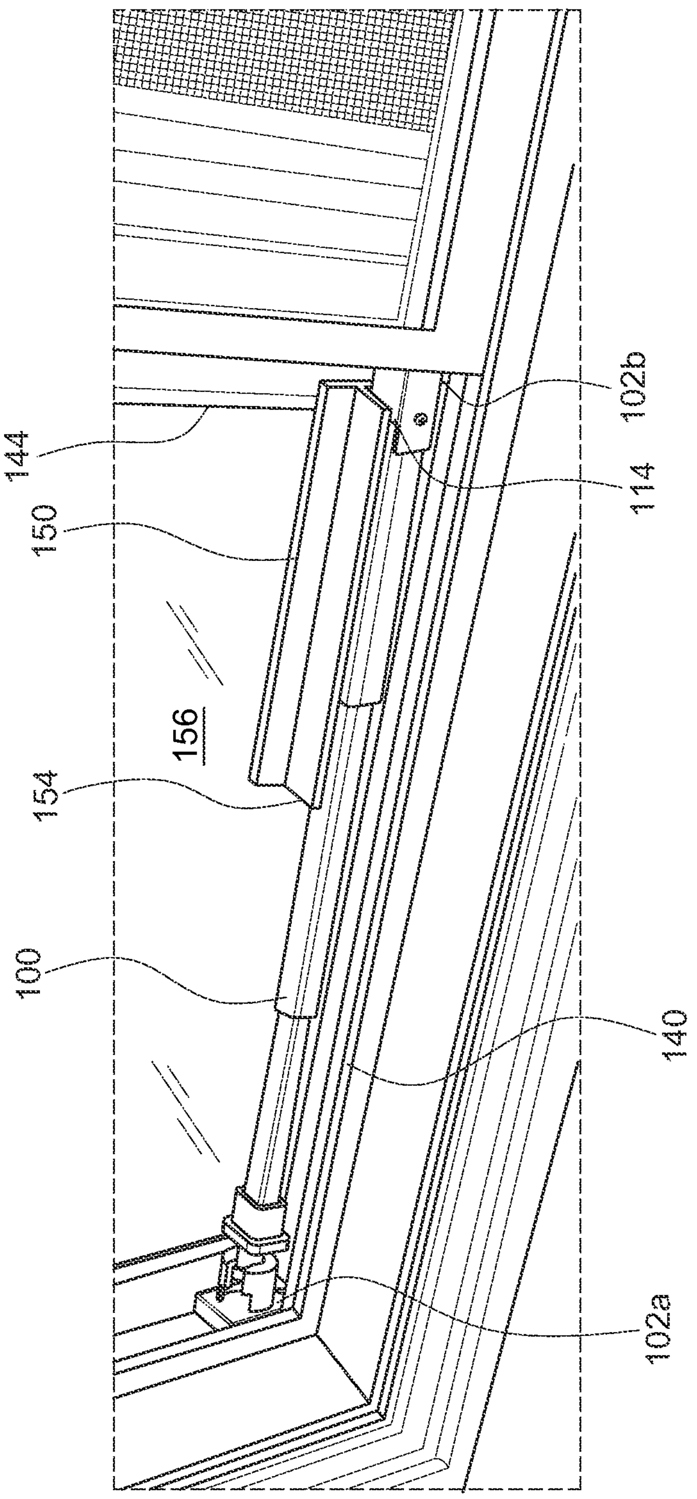
FIG. 22 shows the lock moved adjacent to the T-bar where the lock cannot be pivoted upwards to the unlocked position because it is blocked by the wing of the T-bar.

FIGS. 21 and 22 illustrate how the T-bar 150 of FIG. 20 is utilized to prevent removal of the security device 100 when the window 138 is open. In this embodiment, the device 100 is installed in the window channel 140 in an opposite direction than previously illustrated in FIGS. 8 & 9. In the earlier embodiment of FIGS. 8 & 9, the lock 114 was positioned furthest from the open window 138 and the distance from the open portion of the window 138 to the lock 114 makes it difficult for a person outside the window 138 to unlock the device 100. In contrast, in the embodiment of FIGS. 21 and 22, the device 100 is installed in the window channel 140 such that the second end **102*b* with the lock 114 is against the moveable window sash 144. Thus, the position of the lock 114 relative to the non-moving window frame 142 is dynamically moved back and forth along the window channel 140 depending on whether the window 138** is open or closed.

The T-bar 150 is stuck to the non-moving window surface 156 utilizing an adhesive such as double sided sticky tape or glue at a position such that the lock 114 in the closed position is blocked by the wing 154 of the T-bar 150 when the lock 114 is moved to a middle position of the non-moving window 156 when the moving part of the window 138 is opened. However, when the sliding window 138 is closed, the lock 114 is pulled by the window sash 144 such that it is moved away and free from the wing 154 of the T-bar 150 and can therefore be unlocked by a user.

FIG. 21 illustrates the position of the lock 114 where it is away from the T-bar 150 and can therefore be unlocked when the window is closed. FIG. 22 shows the lock 114 moved adjacent to the T-bar 150 where the lock 114 cannot be pivoted upwards to the unlocked position because it is blocked by the wing 154 of the T-bar 150.

Embodiments utilizing a T-bar 150 such as FIGS. 21 and 22 are advantageous for applications where it is desired that the security device 110 should not be removable from the window when the window is opened. In order to the remove the security device 100, the window must be closed, thereby preventing a prowler or other unauthorized person on the outside of the window from removing the device 100.

Figure 23:
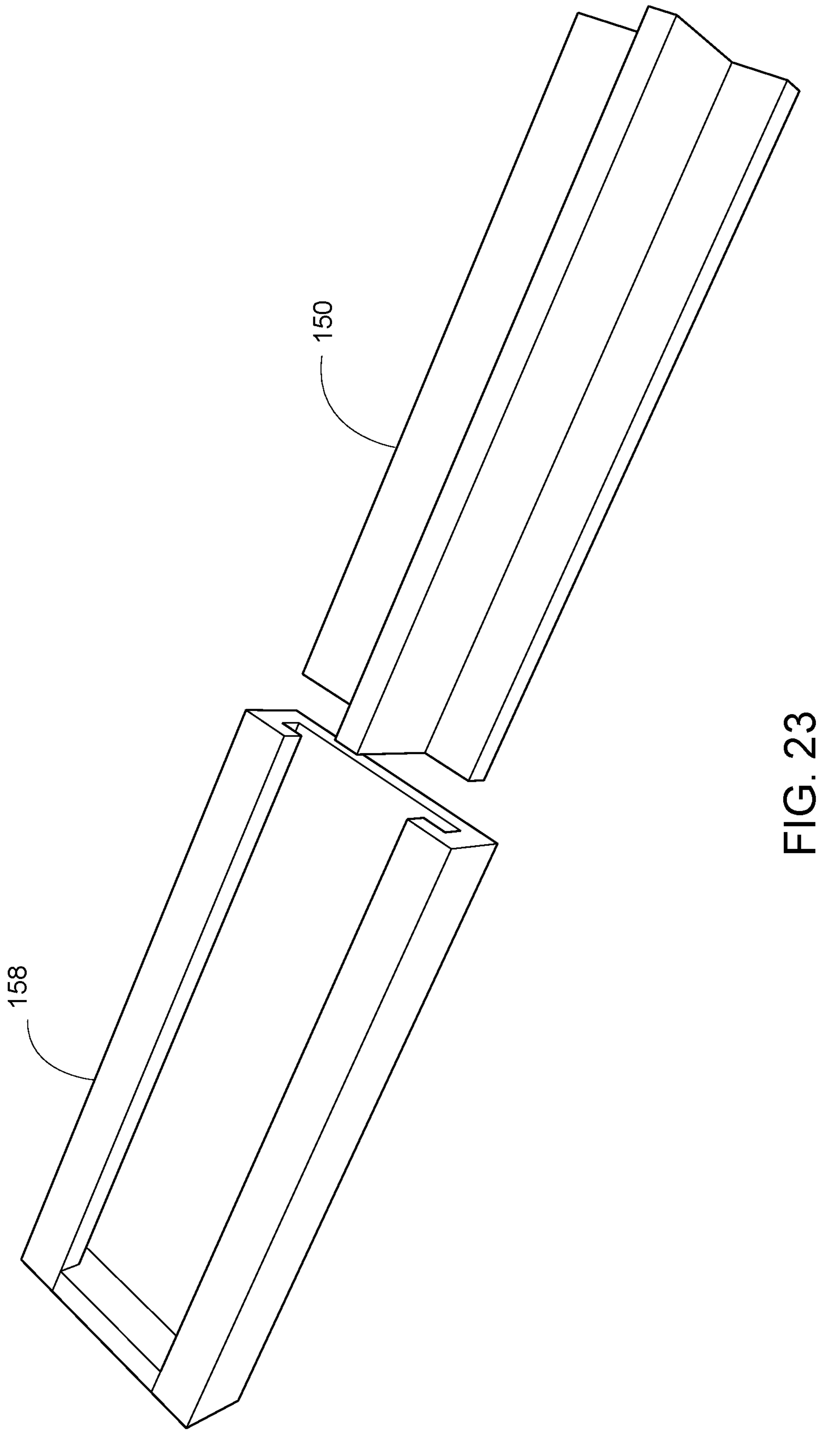
FIG. 23 illustrates a T-bar mounted to the window utilizing a T-bar mount according to an exemplary embodiment.

FIG. 23 illustrates a T-bar 150 mounted to the window utilizing a T-bar mount 158 according to an exemplary embodiment. One potential problem with some embodiments utilizing a single-piece T-bar 150 such as shown in FIG. 20 is that the protruding wing 154 may interfere with the window 138 being fully opened even when the security device 100 is removed from the window channel 140. The T-bar mount 158 of this embodiment helps to prevent this problem because the height of the T-bar mount 158 is ensured to be thin enough that the moving window sash 144 can pass over the T-bar mount 158 when the T-bar 150 is not installed on the mount 158. Usage of the T-bar 150 of FIG. 23 is similar to as described above for the single-piece T-bar 150 except only the mount 158 is permanently fixed to the non-moving window surface 156 utilizing double sided tape and/or other adhesive surface on the back of the mount 158. The T-bar 150 itself is then easily removable from the mount 158 during periods of time when the window 138 is desired to be fully opened.

Figure 24:
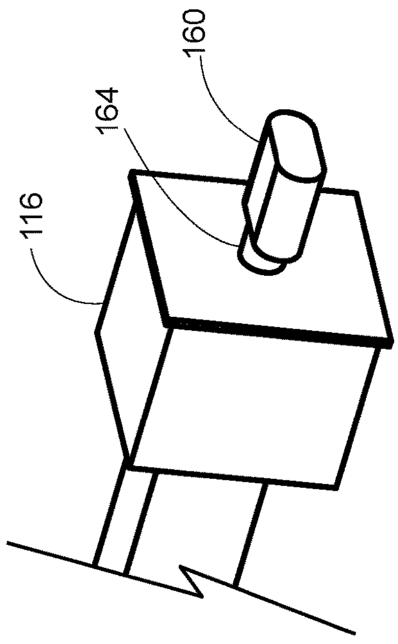
FIG. 24 illustrates a perspective view of an end connector of the telescoping bar having a non-circular-shaped protrusion according to an exemplary embodiment.
Figure 25:
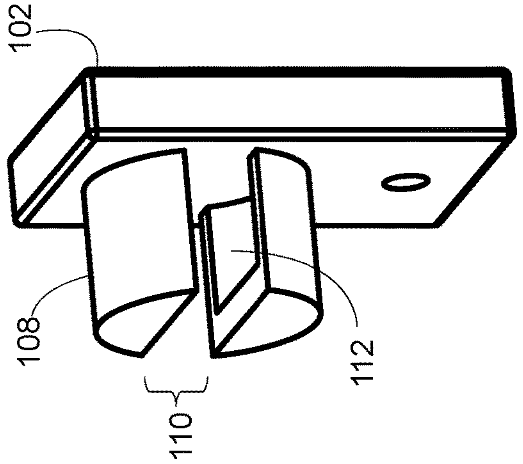
FIG. 25 illustrates a first perspective view of a socket plate for mating with the end connector of FIG. 24 according to an exemplary embodiment.
Figure 26:
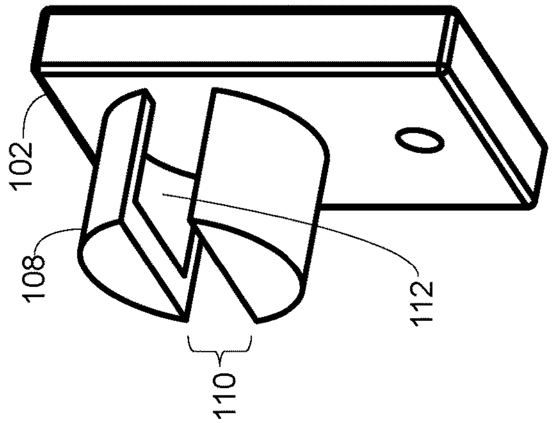
FIG. 26 illustrates a second perspective view of a socket plate for mating with the end connector of FIG. 24 according to an exemplary embodiment.

FIG. 24 illustrates a perspective view of an end connector 116 of the telescoping bar 104 having a non-circular-shaped protrusion 160 according to an exemplary embodiment. FIGS. 25 and 26 illustrate two perspective views of a socket plate 102 for mating with the end connector 116 of FIG. 24 according to an exemplary embodiment. As before, the end connector 116 and socket plate 102 together form a connector pair 128 and operate somewhat similar to previous examples described earlier. However, there are some differences.

For one, the socket plate 102 now has a single narrow jaw opening 110. Likewise, the inner area 112 of the socket 108 is simply a cylindrical shape where a perimeter front edge 162 of the cylindrical shape is blocked by the edge of the jaw opening 110. The non-circular shaped protrusion 160 is connected to the connector end 116 by a circular-shaped neck 164 that has a slightly smaller diameter than the height of the jaw opening 110. Similar to the previous embodiments, the non-circular protrusion 160 can only fit through the jaw opening 110 when rotated to a certain angle (i.e., protrusion 160 lying flat parallel to the plane upon which the plate 102 sits). At this angle the pair 128 of end connector 116 and socket plate 102 can be joined and separated at will by the user. This corresponds to the separable orientable of the connector pair 128.

Figure 27:
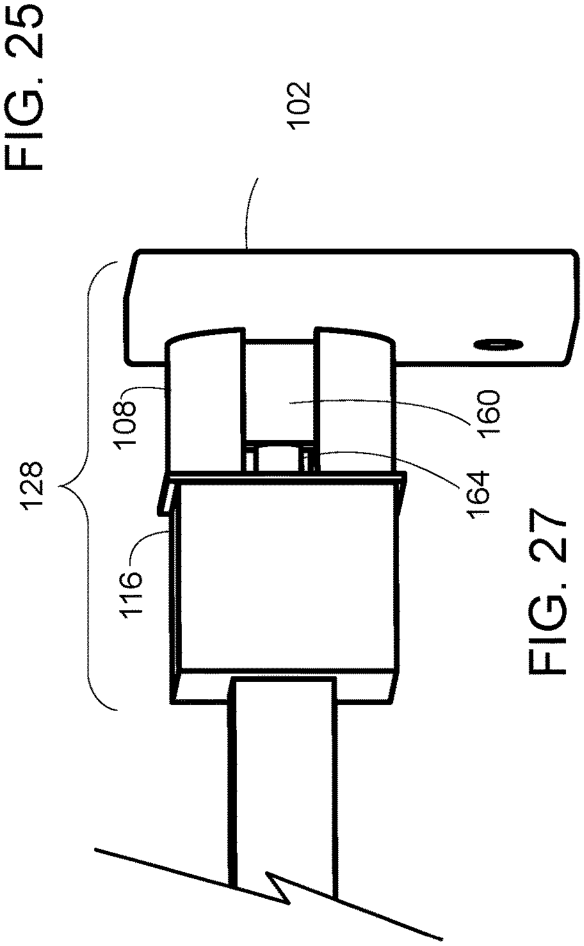
FIG. 27 illustrates a perspective view of the end connector of FIG. 24 and plate of FIG. 25 togetherj joined and forming a connector pair in the inseparable configuration.

FIG. 27 illustrates a perspective view of the end connector 116 of FIG. 24 and plate 102 of FIG. 25 together joined and forming a connector pair 128 in the inseparable configuration. When the telescoping bar 104 is rotated by ninety degrees, the non-circular protrusion 160 is rotated such that it is standing upright substantially perpendicular to the plane upon which the socket plate 102 stands. In this orientation, the connector end 116 cannot be removed from the socket plate 102.

A benefit of the embodiment of FIGS. 24 and 26 is that the two socket plates 102 utilized to hold the device 100 in the window channel 140 are symmetrical and there is no chance that a user may inadvertently install them backwards.

Figure 28:
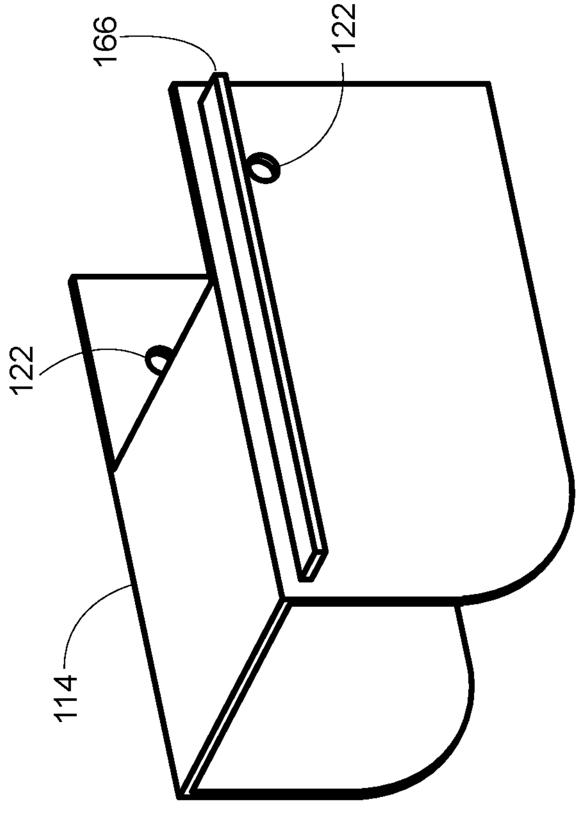
FIG. 28 illustrates a U-shaped plate including a side wing for forming the lock according to an exemplary embodiment.

FIG. 28 illustrates a U-shaped plate including a side wing 166 for forming the lock 114 according to an exemplary embodiment. The lock 114 in this embodiment includes a wing 166 running along the side of the U-shaped plate. The wing 166 is for engaging in a security track 168 mounted on the non-moveable surface 156 of the window at a position similar to as described above for the T-bar 158.

Figure 29:
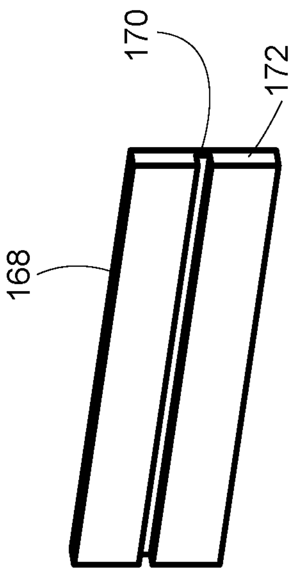
FIG. 29 illustrates a security track for engaging with the wing on the lock of FIG. 28 according to an exemplary embodiment.
Figure 30:
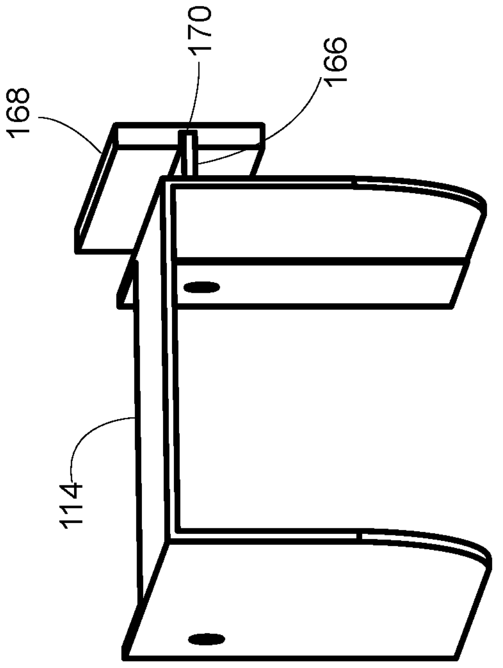
FIG. 30 illustrates how the wing engages with the grove such as when the window is opened to thereby prevent the lock from being unlocked according to an exemplary embodiment.

FIG. 29 illustrates a security track 168 for engaging with the wing 166 on the lock 114 of FIG. 28 according to an exemplary embodiment. The track 168 is formed by a grove 170 that runs along a base structure 172. FIG. 30 illustrates how the wing 166 engages with the grove 170 such as when the window 138 is opened to thereby prevent the lock 114 from being unlocked according to an exemplary embodiment. Similar to the T-bar 150, the security track 168 is positioned on the window surface 156 such that it will engage with the wing 166 only when the sliding window 138 is in the open position. At this time, the grove 170 on the track 168 holds the wing 166 captive and prevents the lock 114 from being unlocked because the lock 144 can no longer be pivoted upward. When the window 138 is closed, the lock 114 is moved in position and the wing 166 slides out of the security track 168. The lock 114 is then free to be pivoted upwards.

A use-case scenario and method of securing a sliding window or door utilizing above described security devices 100 according to an exemplary embodiment is as follows. The steps of the method may be performed by a user utilizing the device such as a residential homeowner or a home security consultant or other vendor, for example. The steps are not restricted to the exact order described, and, in other embodiments, described steps may be omitted or other intermediate steps added.

A beneficial use-case scenario of the security device 100 according to some embodiments is to protect an open window in a way that the device 100 may be easily inserted without mounting-screws. Most sliding windows 138 have a window channel 140. The security device 100 takes advantage of this channel 140 and the open window-sash 144 to secure the window by immobilizing the sash 144. Tamper-proofing features includes socket plates 102 for securing the device 100 to the sash 144 even as the sash 144 is moved. In some embodiments, beneficially when the window is opened, the lock 114 handle will no longer lift.

A method of installing and placing the device 100 in a window is as follows. Size the telescoping bar appropriately and then position the socket plates on the window, locking lever latch 114 first so that it is out of reach. The first plate 102*a* will be against the moving window sash 144 in this case. Install the two ends 116 of the device 100 into their respective sockets—this involves angling the neck 124 or other the non-circular protrusion 160 to fit into the jaw opening 110 on the plates 102.

Once in the window, the user may place a felt pen on top of the side-wing 166 of the lock and open the window about four inches. The user may use that line to place the optional security-track 168 such that it catches the wing 166 as the window 138 opens. The lock 114 is now tamper-proof while the window is open.

Removing the device 100 is done in three easy steps in this embodiment: close the window, release the lock 114 by lifting the handle upwards, and rotate the bar 104 and pulling laterally out of the socket plates by moving the respective necks 124 on either end through their respective narrow openings 110.

In some embodiments, once plates 102 are installed, there are two configurations to choose from depending on user priorities:

Maximize Ease of Exit:

1. Install the lock 114 (lever-end) on the frame 142 side
2. No need to close window to remove device 100. Just lift the lock lever 114, rotate the bar to the appropriate first angle α for the separable orientation, and pull both tube ends.

In some embodiment, the device 100 is sold with instructions including removal instruction decals that may be affixed to the window surface 156 on the top side of the telescoping bar, preferable near the lock 114.

Maximize tamper-proofing: (Or, improve reach in a vertical window without compromising protection/security):

1. Close the window and install the lock 114 (lever-end) of the device 100 on the moving window sash 144 side.
2. Stick two 3-inch 3M-strips (or other adhesive) to the back of the T-bar 150 (or T-bar mount 158).
3. About four inches from the sash 144 and above ⅛ inch above the bar 104, stick the T-bar 150 (or T-bar mount 158) on the back (non-moving) window surface 156.
4. As the window is opened the T-bar now covers the lock lever 114 most of the way.
5. Stick removal instruction decals on the wide side of the T-bar surface and/or T-bar mount 158.
6. On a vertical window, the lever is now within reach and will not drop open.

Beneficially, the device provides ease of assembly for different windows and levels of security. The device 100 may work with wood sliders in a range of sizes and orientations, provided a spacer is included to make up for the lack of window channels. The device 100 may be utilized for horizontally sliding windows and doors as well as those that slide vertically.

Beneficially, the telescoping bar 104 adjusts to fit most window widths with an adjustment button 136 that is protected by the window channel 138. The device 100 may in some applications be removed during the day. Or, the device 100 may be left in place as users open and close the window or door as desired by user preferences.

The device 100 may beneficially help secure a home even during a power outage. For instance, even if the home has AC or a security system, the security device 100 as disclosed herein may act as backup security device to have in the event of a power outage.

In advantageous embodiments, users that need ventilation do not have to worry about leaving a window open. They get security protection while also enjoying a natural breeze.

In an exemplary embodiment, a device for securing sliding windows and doors includes a telescoping bar and a plate. An end of the bar and the plate together form a connector pair that couples the bar end to the plate in one of a separable orientation and an inseparable orientation according to a relative angle between the bar end and the plate. The connector pair allows the bar to be separated from the plate in the separable orientation when the relative angle is a first angle, and the connector pair prevents the bar end being separated from the plate in the inseparable orientation when the relative angle is a second angle. A lock in the locked position physically prevents the relative angle between the bar end and the plate being changed from the second angle to the first angle. A T-bar or side-wing may prevent unlocking when the window or door is open.

Although the invention has been described in connection with preferred embodiments, it should be understood that various modifications, additions and alterations may be made to the invention by one skilled in the art without departing from the spirit and scope of the invention.

For example, although the socket 108 is on the plate 102 and the non-circular neck 124 or other protrusion 160 is on the end 116 of the telescoping bar 104 in the above examples, these are reversed in some embodiments. For instance, in some embodiments, the non-circular protrusion 160 is located on the plate 102 with the corresponding socket 108 on the bar end 116.

Although above examples have a connector pair on both sides 116, in some embodiments the locking connector pair is only present on one side 116. Likewise, the lock 114 may be a lever that pivots as illustrated above. However, other types of locks that prevent relative rotation between the bar ends 116 and the plates 102 may be utilized. Examples of locks 114 includes pivots, sliders, rotators, etc.

Other mechanism for length setting besides the spring-loaded tab 136 and plurality of length setting holes 134 may be utilized. For instance, more tamper resistant adjustment means may be utilized such as locking set screws, for example. In other embodiments, the outer bar 104*a* and middle bar 104*b* are fixed in length or otherwise formed by a single bar. The telescoping bar 104 is therefore only telescoping in portion being an inner bar 104*b* that allows the window 138 to open a predetermined amount, i.e., a fixed minimum length setting for the telescoping bar 104. Lever-clamps, like those found on a camera tripod, could also be used in place of the spring-loaded tab between telescoping tubes.

High friction surfaces such as rubber padding instead of adhesive may be utilized on the back surface of the plates

118 for embodiments where the plates are screwed to the window frame 142 and sash 144.

Functions of single elements may be separated into multiple elements, or the functions of multiple elements may be combined into a single element. All combinations and permutations of the above described features and embodiments may be utilized in conjunction with the invention.

What is claimed is:

1. A device for securing sliding windows and doors, the device comprising:

a telescoping bar having a first end and a second end with an adjustable length therebetween, the telescoping bar being formed by a plurality of bars that each have a square tubular shape and that slidably fit one inside another; wherein a length of the telescoping bar is adjustable by sliding the plurality of bars relative one another along an axis running lengthwise along a center of the telescoping bar from the first end to the second end, and the square tubular shape of each of the plurality of bars is configured such that a rotation of one of the plurality of bars around the axis rotates each of the plurality of bars in the telescoping bar around the axis;

a neck formed by a protrusion extending outwardly from the first end of the telescoping bar along the axis of the telescoping bar; wherein, when viewed in a first cross section taken across a first plane perpendicular to the axis, the neck has a two-dimensional shape with a height dimension longer than a width dimension;

a socket plate for coupling to the first end of the telescoping bar, the socket plate having a rectangular base with a back surface for attachment to an external surface and a front surface for facing toward the first end of the telescoping bar;

a socket extending from the front surface of the socket plate for receiving the neck of the telescoping bar; wherein, when viewed in a second cross section taken across a second plane perpendicular to the axis, the socket has a C-shaped perimeter with a circular inner diameter of the C-shaped perimeter being greater than or equal to the height dimension of the neck thereby allowing the neck to be rotated around the axis once the neck is fully inserted into an inner area within the C-shaped perimeter of the socket, the socket has a jaw opening of the C-shaped perimeter leading to the inner area of the socket and the jaw opening has a width that is greater than or equal to the width dimension of the neck thereby allowing the neck to pass through the jaw opening when a relative angle between the telescoping bar and the socket plate around the axis is adjusted by a user such that the width dimension of the neck aligns with the width of the jaw opening, and the width of the jaw opening is less than the height dimension of the neck thereby preventing the neck from passing through the jaw opening when the relative angle between the telescoping bar and the socket plate is adjusted by the user such that the width dimension of the neck does not align with the width of the jaw opening; and a lock formed by a U-shaped plate mounted to the telescoping bar at a pivot point and pivotable between a locked position and an unlocked position; wherein, when the lock is pivoted by the user into the unlocked position, the U-shaped plate is pivoted away from the socket plate such that the U-shaped plate does not abut against the socket plate and thereby does not interfere with rotation of the telescoping bar around the axis relative to the socket plate thereby allowing the relative angle between the telescoping bar and the socket plate to be changed; and, when the lock is pivoted by the user into the locked position, the U-shaped plate abuts against and wraps around a plurality of sides of the rectangular base of the socket plate such that the U-shaped plate engages with the rectangular base of the socket plate and thereby physically prevents the relative angle between the telescoping bar and the socket plate from being changed.

2. The device of claim 1, further comprising:

a knob on an end of the neck; wherein, when viewed in a third cross section taken across a third plane perpendicular to the axis, the knob has a circular shape with a diameter that is longer than the width dimension of the neck; and the jaw opening on the socket includes two portions: a first jaw opening with a width that allows the width dimension of the neck to pass but not the diameter of the knob to pass, and a second jaw opening that allows the diameter of the knob to pass.

3. The device of claim 2, wherein:

the inner area of the socket has a recessed area sized to fit the knob on a side of the inner area toward the telescoping bar and into which the knob slips when pulled by the telescoping bar moving along the axis when the telescoping bar is reduced in length; and the second jaw opening of the socket does not extend into the recessed area such that, in order to separate the first end of the telescoping bar from the socket plate, the knob must be physically moved within the inner area by increasing the length of the telescoping bar along the axis to thereby cause the knob to exit the recessed area before being able to pass via the second jaw opening.

4. The device of claim 2, wherein:

the inner area has a flat wall on a side of the inner area toward the telescoping bar; and the second jaw opening extends into the inner area adjacent the flat wall such that, in order to separate the first end of the telescoping bar from the socket plate, the knob can be slid laterally along the flat wall to thereby pass via the second jaw opening.

5. The device of claim 1, further comprising:

a second neck extending outwardly from the second end of the telescoping bar, the second neck having a same structure as the neck extending outwardly from the first end of the telescoping bar; and a second socket plate for coupling to the second end of the telescoping bar, the second socket plate having symmetrical structure to the socket plate for coupling to the first end of the telescoping bar.

6. A method of utilizing the device of claim 1, the method comprising mounting the back surface of the rectangular base of the socket plate against a frame member adjacent a sliding channel of a sliding window or door.

7. The method of claim 6, further comprising mounting the back surface of the rectangular base of the socket plate to a fixed frame member of the sliding window or door.

8. The method of claim 6, further comprising mounting the back surface of the rectangular base of the socket plate to a sash frame member that moves along the sliding channel.

9. The device method of claim 6, wherein the socket plate has a width less than or equal to a width of the sliding channel such that socket plate sits within the sliding channel.

10. The method of claim 6, wherein the sliding channel contains one of a slidable window and a slidable door.

11. The method of claim 6, further comprising coupling the telescoping bar to the socket plate such that the wherein the telescoping bar lies within the sliding channel.

12. The method of claim 6, further comprising positioning the socket plate in the sliding channel such that the jaw opening is facing away from the sliding window or door thereby allowing the neck to pass via the jaw opening without the telescoping bar being blocked by the sliding window or door.

13. The of claim 1, further comprising a T-bar having a base with a wing running along a length of the base and extending therefrom perpendicular to the base.

14. A method of utilizing the device of claim 13, the method comprising:

mounting the T-bar to a surface of a window or door adjacent to the telescoping bar utilizing a T-bar mount affixed to the surface; and connecting the T-bar to the T-bar mount via a tongue-and-grove mounting system.

15. The of claim 1, further comprising:

a security track mount for mounting to a surface of a non-moving portion of a window or door being secured by the device at a position on the surface such that the security track mount is adjacent the lock when the window or door is in an open position;

a wing extending laterally from a side of the lock that engages the security track when the window or door is in the open position to thereby prevent the lock from being pivoted from the locked position when the window or door is in the open position.

16. A method of utilizing the device of claim 13, the method comprising mounting the T-bar to a surface of a non-moving portion of a window or door being secured by the device at a position on the surface such that the wing of the T-bar blocks the lock from being pivoted from the locked position when the window or door is in an open position.

17. The of claim 1, wherein:

the plurality of bars forming the telescoping bar comprises an outer bar, a middle bar, and an inner bar;

the middle bar fits inside the outer bar and the inner bar fits inside the middle bar;

the outer bar has a plurality of length-setting holes spaced apart a length of the outer bar;

the middle bar has a spring-loaded tab protrusion that fits into a desired length-setting hole thereby allowing the user to set a minimum length of the telescoping bar; and the inner bar has no length-setting mechanism and therefore is freely slidable at all times within the middle bar.

18. A method of utilizing the device of claim 1, the method comprising installing the device in a channel of a slidable window or door with the device orientated such that the lock is positioned away from an openable part of the slidable window or door.

* * * * *